(12) United States Patent
Nonaka

(10) Patent No.: US 7,898,143 B2
(45) Date of Patent: Mar. 1, 2011

(54) ROTARY ELECTRIC MOTOR

(75) Inventor: Tuyoshi Nonaka, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/550,403

(22) Filed: Aug. 31, 2009

(65) Prior Publication Data

US 2009/0322180 A1    Dec. 31, 2009

Related U.S. Application Data

(63) Continuation of application No. PCT/JP2008/058904, filed on May 15, 2008.

(30) Foreign Application Priority Data

Jun. 6, 2007    (JP) .............................. 2007-150638

(51) Int. Cl.
*H02K 3/46* (2006.01)

(52) U.S. Cl. ....................................... 310/260; 310/215

(58) Field of Classification Search .................. 310/215, 310/260, 43, 45

See application file for complete search history.

(56) References Cited

U.S. PATENT DOCUMENTS 3,042,820 A  *  7/1962  Diamond ...................... 310/93
3,701,911 A  *  10/1972  Hallerback ................. 310/60 R
4,048,530 A  *  9/1977  Kaufman, Jr. ................. 310/89
4,083,917 A  *  4/1978  Hallerback et al. .......... 264/263
5,066,880 A  *  11/1991  Banon .................... 310/156.55
5,723,933 A  *  3/1998  Grundl et al. ................ 310/266
6,040,647 A  *  3/2000  Brown et al. ................... 310/89
6,242,836 B1  *  6/2001  Ishida et al. ................. 310/215

FOREIGN PATENT DOCUMENTS

| JP | 10-098844 | 4/1998 |
|---|---|---|
| JP | 2001-309595 | 11/2001 |
| JP | 2002-369449 | 12/2002 |
| JP | 2004-015957 | 1/2004 |
| JP | 2004-242423 | 8/2004 |
| JP | 2005-072428 | 3/2005 |
| JP | 2006-295106 | 10/2006 |
| JP | 2007-104783 | 4/2007 |
| WO | WO 2005/069319 | 7/2005 |

* cited by examiner

*Primary Examiner*—Dang D Le
(74) *Attorney, Agent, or Firm*—Ditthavong Mori & Steiner, P.C.

(57) ABSTRACT

A rotary electric motor includes a cylindrical rotor having an outer peripheral side, a stator provided to surround the outer peripheral side of the rotor with a gap between the stator and the rotor, and a load side bracket having a recess and provided on a load side of the stator. The stator includes stator coils and a stator core having teeth portions around which the stator coils are wound. A load side coil end of each of the stator coils protrudes from a load side end face of the stator core. At least two of an inner peripheral surface, an outer peripheral surface, and an end face of the load side coil end contact an inner surface of the recess via an insulator.

9 Claims, 11 Drawing Sheets

Fig.4D
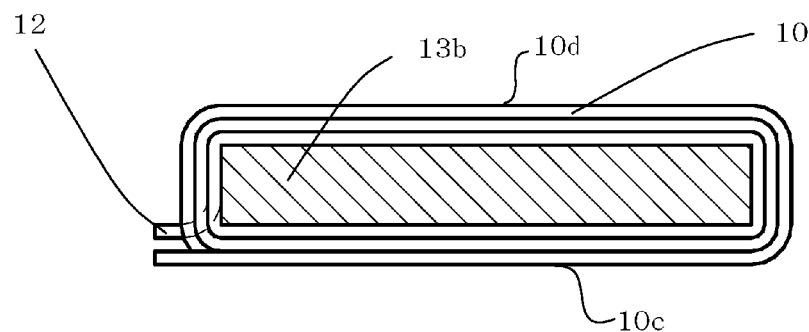
Fig.4 B  Fig.4 A  Fig.4 C
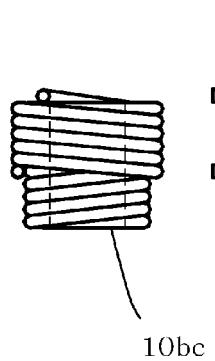 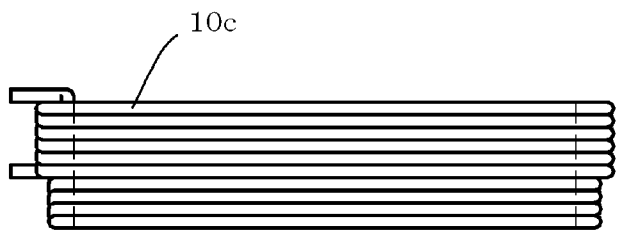 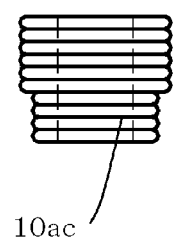

Fig. 10A KNOWN STRUCTURE: HEATING 82.5W
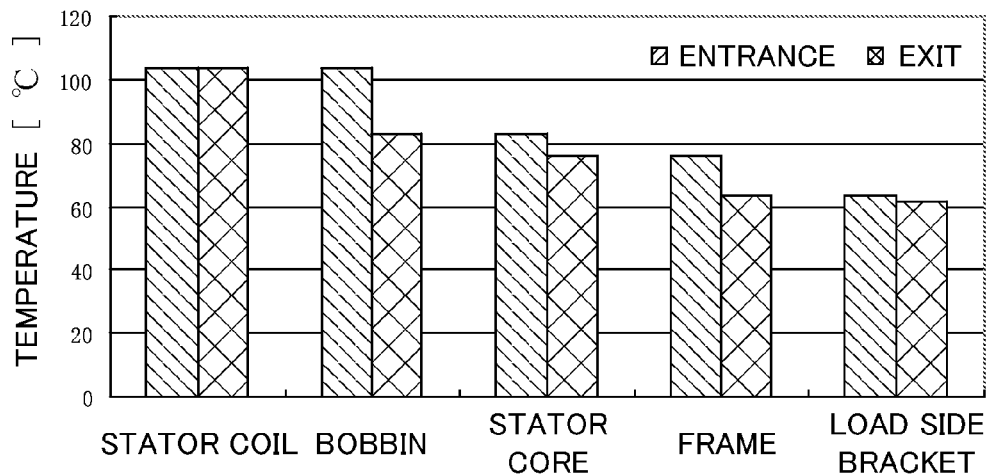
Fig. 10B STRUCTURE OF EMBODIMENT: HEATING 82.5W
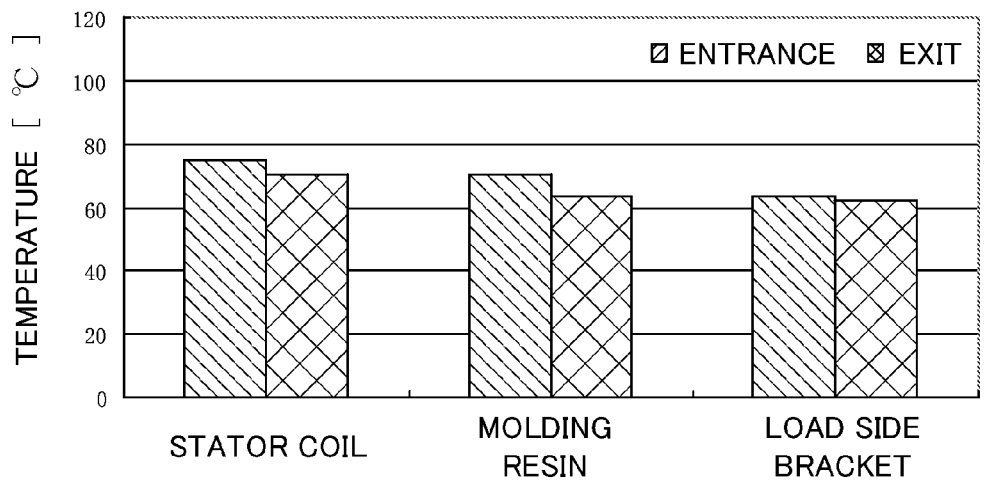
Fig. 10C STRUCTURE OF EMBODIMENT: HEATING 251.0W
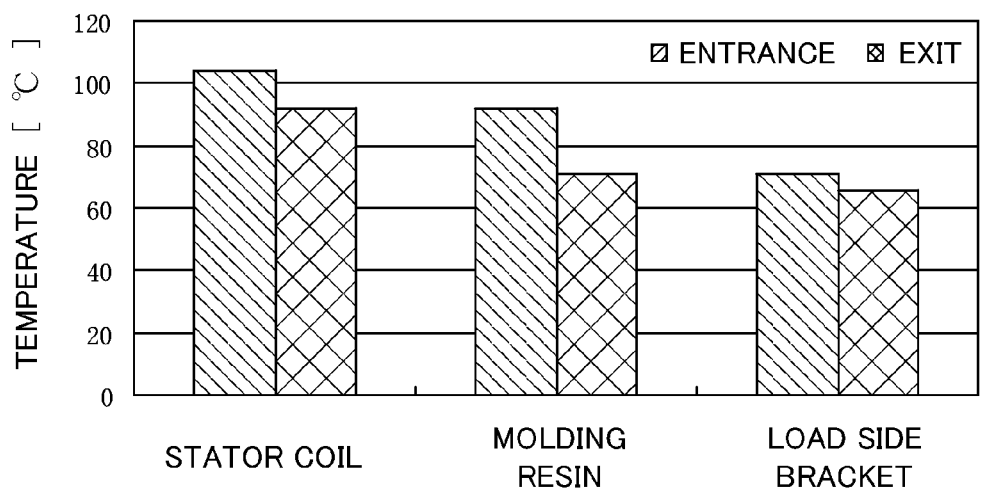

ROTARY ELECTRIC MOTOR

CROSS-REFERENCE TO RELATED APPLICATION

The present application is related to PCT patent application Ser. No. PCT/JP2008/058904, filed May 15, 2008, entitled "REVOLVING ELECTRIC DEVICE, AND ITS MANUFACTURING METHOD", which claims priority to Japanese Patent Application No. 2007-150638, filed Jun. 6, 2007. The contents of these applications are incorporated herein by reference in their entirety.

BACKGROUND OF THE INVENTION

1. Field of the Invention

The present invention relates to a rotary electric motor.

2. Description of the Related Art

Known techniques are to, in a known rotary electric motor that includes a cylindrical rotor and a stator to which a stator coil is attached, for example, release heat generated in the stator coil from a frame provided around the stator to the exterior of the rotary electric motor or release heat from a load side bracket joined to the frame to the exterior of the rotary electric motor (for example, FIG. 2 in Japanese Unexamined Patent Application Publication No. 10-98844, FIG. 1 in Japanese Unexamined Patent Application Publication No. 2002-369449, FIG. 1 in Japanese Unexamined Patent Application Publication No. 2001-309595, and FIG. 1 in Japanese Unexamined Patent Application Publication No. 2005-72428).

SUMMARY OF THE INVENTION

According to one aspect of the present invention, a rotary electric motor includes a cylindrical rotor having an outer peripheral side, a stator provided to surround the outer peripheral side of the rotor with a gap between the stator and the rotor, and a load side bracket having a recess and provided on a load side of the stator. The stator includes stator coils and a stator core having teeth portions around which the stator coils are wound. A load side coil end of each of the stator coils protrudes from a load side end face of the stator core. At least two of an inner peripheral surface, an outer peripheral surface, and an end face of the load side coil end contact an inner surface of the recess via an insulator.

According to another aspect of the present invention, a rotary electric motor includes a cylindrical rotor having an outer peripheral side, a stator including stator coils and provided to surround the outer peripheral side of the rotor with a gap between the stator and the rotor, and a load side bracket having a recess and provided on a load side of the stator. At least two faces of an inner peripheral surface, an outer peripheral surface, and an end face of a load side coil end of each of the stator coils contact an inner surface of the recess via an insulator.

According to an embodiment, a method for manufacturing a rotary electric motor is provided. The rotary electric motor includes a cylindrical rotor, a stator that is provided on an outer peripheral side of the rotor, with a gap between the stator and the rotor, and includes a stator core including teeth portions and stator coils fixed to the teeth portions so that a load side coil end of each of the stator coils protrudes from a load side end face of the stator core, and a load side bracket provided on a load side of the stator, a recess being formed in a portion of the load side bracket opposing the load side coil end. At least two faces out of an inner peripheral surface, an outer peripheral surface, and an end face of the load side coil end are set close to the recess, with an insulator therebetween.

In the method, all of the inner peripheral surface, the outer peripheral surface, and the end face of the load side coil end may be set close to the recess, with an insulator therebetween.

In the method, the stator coil may be formed by, after winding a round copper wire that includes an insulating coating, forming outer surfaces of the wound round copper wire by applying pressure using a die. In this case, furthermore, before pressure forming or after pressure forming, the wound round copper wire may be bonded by heat fusion bonding of the insulating coating or using an adhesive.

In the method, outer surfaces of the stator coil may be formed by applying pressure using a die in a three-dimensional manner. In this case, furthermore, the stator coil may be formed of a copper wire that is wound in a fairly neat manner, crossing of the copper wire that occurs in winding may exist only on a first outer surface corresponding to an end face of an opposite-to-load side coil end of the stator coil, and outer surfaces other than the first outer surface may be formed by applying pressure using a die.

In the method, outer surfaces of the stator coil may be formed by applying pressure using a die, the stator coil, the outer surfaces of which have been formed by applying pressure, may be fixed to a corresponding one of the teeth portions of the stator core insulated with, for example, an insulating paper or powder coating, and the stator coil fixed to the teeth portion may be integrated with the stator core using an adhesive or molding resin.

BRIEF DESCRIPTION OF THE DRAWINGS

The present invention will be described in further detail with reference to the accompanying drawings wherein:

FIGS. 4A to 4D show how to wind a stator coil;

FIGS. 10A to 10C are views in which the heat releasing capability of a permanent magnet motor having a known structure is compared with the heat releasing capability of a permanent magnet motor according to the first embodiment of the present invention.

DETAILED DESCRIPTION OF THE PREFERRED EMBODIMENTS

First Embodiment

Figure 1:
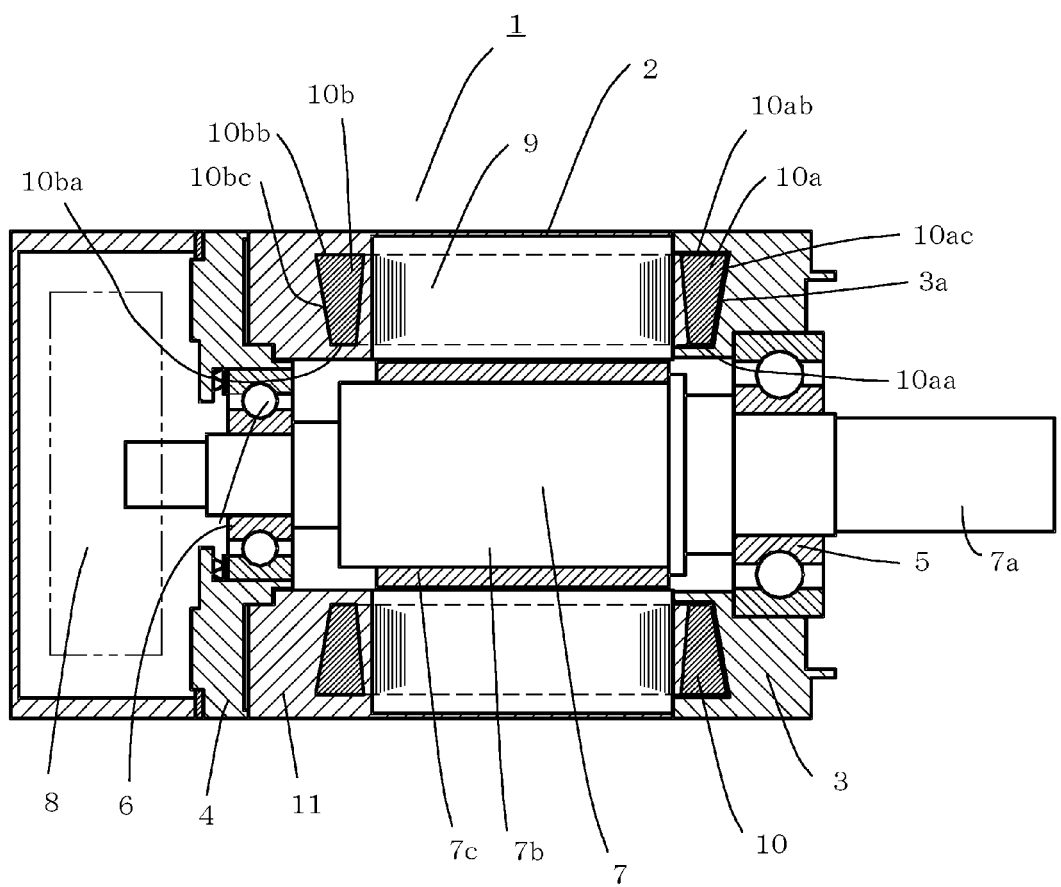
FIG. 1 is a side elevational view of a rotary electric motor according to a first embodiment of the present invention.

FIG. 1 is a side elevational view of a rotary electric motor according to a first embodiment of the present invention. FIG.

Figure 2:
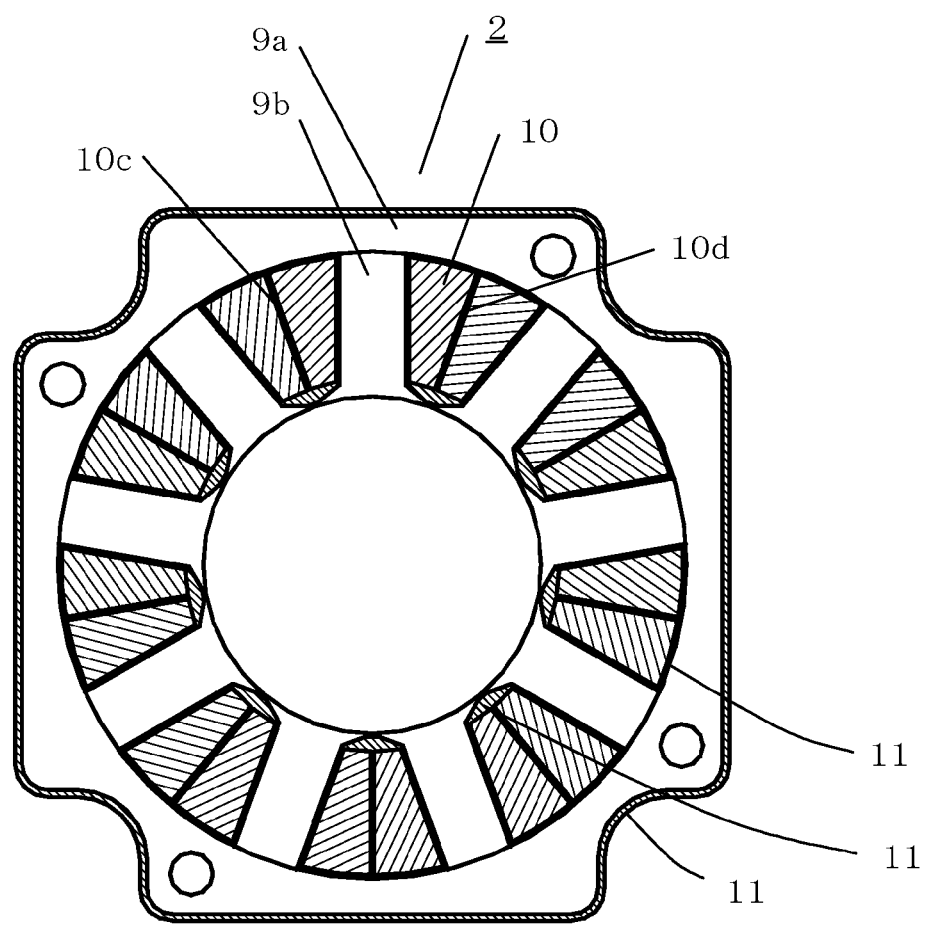
FIG. 2 is a front elevational view of the rotary electric motor shown in FIG. 1.

2 is a front elevational view of the rotary electric motor shown in FIG. 1. In FIG. 2, a rotor is not shown.

In FIGS. 1 and 2, reference numeral 1 denotes a rotary electric motor, for example, a permanent magnet motor. The rotary electric motor 1 includes a stator 2, a load side bracket 3, an opposite-to-load side bracket 4, a bearing 5, a bearing 6, a rotor 7, and a rotation detector 8. The load side bracket 3 is disposed on the load side of the stator 2. A recess 3a in the shape of a ring in the circumferential direction is formed on the stator 2 side of the load side bracket 3. The opposite-to-load side bracket 4 is disposed on the opposite-to-load side of the stator 2.

The rotor 7 is cylindrical and includes a rotating shaft 7a that is rotatably supported through the bearings 5 and 6 provided at the load side bracket 3 and the opposite-to-load side bracket 4 respectively. A rotor core 7b is fitted to the rotating shaft 7a. A permanent magnet 7c is attached to the outer peripheral surface of the rotor core 7b. In this case, the rotor core 7b is not necessarily required in the rotor 7. Alternatively, the permanent magnet 7c may be attached to the outer peripheral surface of the rotating shaft 7a of larger diameter. The rotation detector 8 includes, for example, an encoder and is disposed on the opposite-to-load side of the opposite-to-load side bracket 4.

The stator 2 includes a stator core 9 and stator coils 10 and is provided on the outer peripheral side of the rotor 7, with a gap between the stator 2 and the rotor 7. The stator core 9 includes a yoke portion (an outside stator core) 9a and teeth portions (an inside stator core) 9b that are fitted and fixed to the yoke portion 9a.

The stator coils 10 are fixed to the teeth portions 9b. Portions between the teeth portions 9b, a load side coil end 10a of each of the stator coils 10, and an opposite-to-load side coil end 10b of the stator coil 10 are molded using resin 11.

The load side coil end 10a protrudes from the load side end face of the stator core 9. The outer shape of the load side coil end 10a corresponds to the recess 3a of the load side bracket 3. Three faces, an inner peripheral surface 10aa, an outer peripheral surface 10ab, and an end face 10ac in the rotation axis direction (hereinafter simply called an end face), of the load side coil end 10a contact an inner surface of the recess 3a of the load side bracket 3, with the resin 11 serving as an insulator between the three faces and the recess 3a. Thus, heat generated in the stator coil 10 is more efficiently transferred from the load side coil end 10a directly to the load side bracket 3 to be more efficiently released to the exterior of the rotary electric motor 1. Moreover, as the heat releasing capability is improved, the rated output can be improved. Moreover, the load side coil end 10a is inserted into the recess 3a. Thus, fixation of the load side coil end 10a is solid compared with that in a case where, for example, only the end face 10ac of the load side coil end 10a is in contact with the load side bracket 3, in which the recess 3a is not formed. That is, contact between the load side coil end 10a and the load side bracket 3 is stabilized.

The opposite-to-load side coil end 10b protrudes from the opposite-to-load side end face of the stator core 9. In FIG. 1, reference letter 10ba denotes the inner peripheral surface of the opposite-to-load side coil end 10b, reference letter 10bb denotes the outer peripheral surface of the opposite-to-load side coil end 10b, and reference letter 10bc denotes an end face of the opposite-to-load side coil end 10b.

Moreover, the stator coil 10 includes an air-core coil formed by molding the outer shape of the load side coil end 10a by applying pressure using a die after winding an inexpensive round copper wire that includes an insulating coating.

Thus, in a state in which the stator coil 10 is fixed to one of the teeth portions 9b, each of the inner peripheral surface 10aa and the outer peripheral surface 10ab of the load side coil end 10a forms a highly accurate cylindrical surface, and the end face 10ac of the load side coil end 10a forms a highly accurate conical surface. Thus, although some unevenness occurs on the aforementioned three faces because a round copper wire is used, the unevenness is very little, and the aforementioned three faces are substantially flat. That is, each of the aforementioned three faces is substantially parallel to an opposing face of the recess 3a of the load side bracket 3. Thus, the thickness of the resin 11 molding the load side coil end 10a can be reduced to the maximum extent that insulation is ensured. Thus, satisfactory heat transfer from the load side coil end 10a to the load side bracket 3 can be achieved by reducing the distance between the load side coil end 10a and the load side bracket 3 as much as possible. Moreover, since the stator coil 10 is an air-core coil, a winding operation of winding a round copper wire around a bobbin is unnecessary, and any bobbin need not be used. Thus, an arrangement in which only a load side coil end without a bobbin is provided on the load side of the stator coil 10 may be adopted. In this arrangement, a bobbin does not prevent the gap between the load side coil end 10a and the load side bracket 3 from being reduced. Moreover, known winding techniques and pressure forming techniques can be applied to forming an air-core coil, and thus any special copper wire, special coil formation device, and the like are unnecessary.

Moreover, although faces 10c and 10d of the stator coil 10 at which the stator coil 10 is adjacent to other ones of the stator coils 10 are close to the other stator coils 10, the faces 10c and 10d are insulated from the other stator coils 10 using the resin 11 serving as an insulator while a correct insulation distance is kept.

Figure 3:
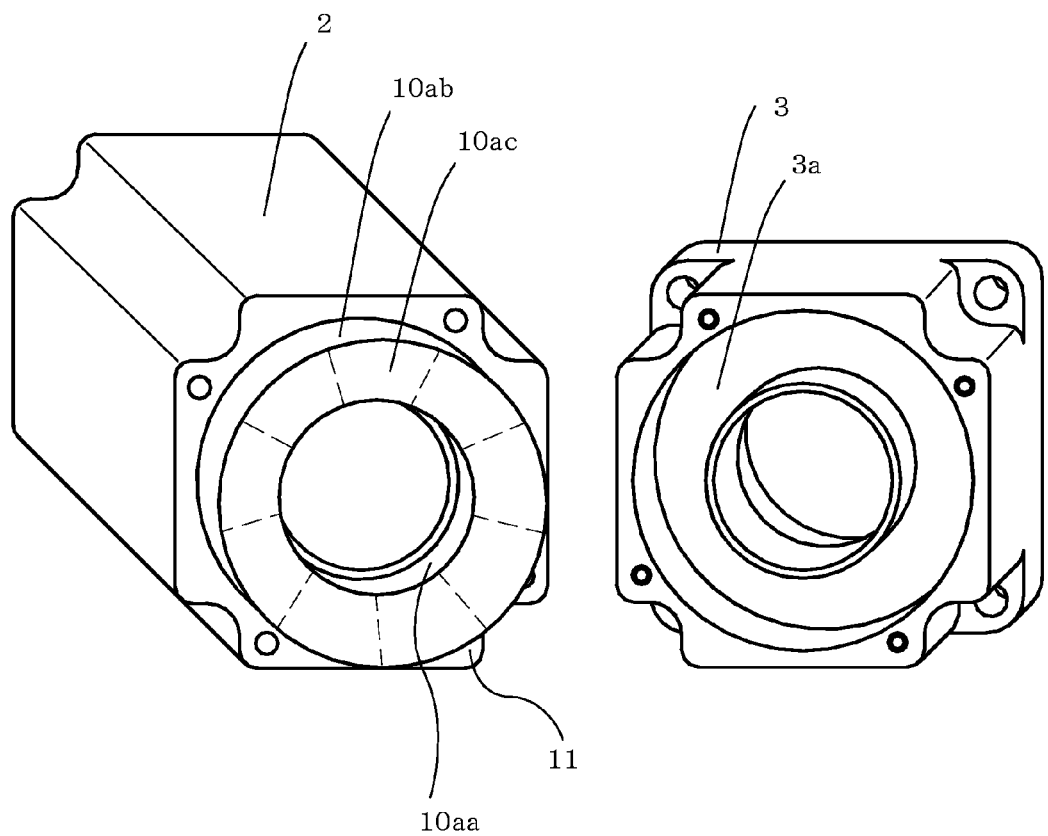
FIG. 3 is an exploded perspective view in which a stator is disassembled from a load side bracket.

FIG. 3 is an exploded perspective view in which the stator 2 is disassembled from the load side bracket 3. In FIG. 3, the rotor 7 is not shown. When the load side bracket 3 is fixed to the stator 2, the three faces, the inner peripheral surface 10aa, the outer peripheral surface 10ab, and the end face 10ac, of the load side coil end 10a contact the inner surface of the recess 3a, with the resin 11 between the three faces and the recess 3a. Thus, heat generated in the stator coil 10 is more efficiently transferred from the load side coil end 10a directly to the load side bracket 3 to be released to the exterior of the rotary electric motor 1.

In the first embodiment, the load side coil end 10a contact the inner surface of the recess 3a of the load side bracket 3, with the resin 11 serving as an insulator between the load side coil end 10a and the recess 3a. That is, the load side coil end 10a is insulated from the recess 3a with the resin 11. However, when the rotary electric motor 1 is a low-voltage rotary electric motor, the load side coil end 10a may be insulated from the recess 3a with, instead of the resin 11, the insulating coating of the round copper wire of the stator coil 10. In this case, the load side coil end 10a is in direct contact with the inner surface of the recess 3a of the load side bracket 3.

Moreover, while, in the first embodiment, the three faces, the inner peripheral surface 10aa, the outer peripheral surface 10ab, and the end face 10ac, of the load side coil end 10a contact the inner surface of the recess 3a of the load side bracket 3, with the resin 11 serving as an insulator between the three faces and the recess 3a, the present invention is not limited to this arrangement. Alternatively, two faces out of the three faces may contact the inner surface of the recess 3a of the load side bracket 3. In this case, it is advised to form the outer shape of the load side coil end 10a by applying pressure using a die so that the two faces contact the inner surface of the recess 3a of the load side bracket 3. Even in such a case, the heat releasing capability can be improved.

A method for manufacturing the stator 2 described above will now be described. The stator core 9 is constructed by combining the yoke portion (an outside stator core) 9a and the teeth portions (an inside stator core) 9b. Thus, the stator coils 10 the outer shape of which is formed by applying pressure using a die are first fixed to the teeth portions 9b insulated with, for example, an insulating paper or powder coating. After this operation, in a state in which the teeth portions 9b are disposed along the internal circumference of the yoke portion 9a, molding is performed using the resin 11 to integrate the yoke portion 9a, the teeth portions 9b, and the stator coils 10. In this process, the stator 2 is manufactured. Alternatively, the yoke portion 9a, the teeth portions 9b, and the stator coils 10 may be integrated using an adhesive.

FIGS. 4A to 4D show how to wind the stator coil 10. FIG. 4A is a view in which the stator coil 10 is viewed from a direction perpendicular to the rotation axis direction. The right side of FIG. 4A is the load side direction, and the left side of FIG. 4A is the opposite-to-load side direction. FIG. 4B is a view in which the stator coil 10 shown in FIG. 4A is viewed from the opposite-to-load side. FIG. 4C is a view in which the stator coil 10 shown in FIG. 4A is viewed from the load side. FIG. 4D is a view in which the stator coil 10 shown in FIG. 4A is viewed from the top of the FIG. 4A.

In FIGS. 4A to 4D, the stator coil 10 is formed of a round copper wire 12 that includes an insulating coating. The round copper wire 12 is wound in a fairly neat manner from an end of the stator coil 10 on the opposite-to-load side. At the end face 10ac of the load side coil end 10a and the faces 10c and 10d, at which the stator coil 10 is adjacent to the other stator coils 10, the round copper wire 12 is wound entirely in parallel, and no lead for winding the round copper wire 12 is taken. The lead of the round copper wire 12 is taken at the end face 10bc of the opposite-to-load side coil end 10b. Similarly, when the second layer of the round copper wire 12 is wound after the first layer of the round copper wire 12 is wound, the lead of the round copper wire 12 is taken at the end face 10bc of the opposite-to-load side coil end 10b. Thus, the round copper wire 12 is crossed between the upper and lower layers at the end face 10bc of the opposite-to-load side coil end 10b. Thus, the three faces except the end face 10bc of the opposite-to-load side coil end 10b are relatively flat. This facilitates pressure forming in the downstream steps.

The stator coil 10 having been wound is fixed to a lower punch 13b serving as a die. Subsequently, the three faces, except the end face 10bc of the opposite-to-load side coil end 10b, of the stator coil 10 are pressed in a three-dimensional manner, using the lower punch 13b and other dies described below. In this operation, the outer shape of the stator coil 10 is formed.

The three faces, the inner peripheral surface 10aa, the outer peripheral surface 10ab, and the end face 10ac, of the load side coil end 10a of the stator coil 10 become substantially flat by forming the end face 10ac of the load side coil end 10a by applying pressure, as described above. Thus, the thickness of the resin 11 molding the load side coil end 10a can be reduced to the maximum extent that insulation is ensured. Thus, satisfactory heat transfer from the load side coil end 10a to the load side bracket 3 can be achieved by reducing the distance between the load side coil end 10a and the load side bracket 3 as much as possible.

Moreover, a correct insulation distance between the faces 10c and 10d adjacent to the other stator coils 10 and the other stator coils 10 is kept, though the faces 10c and 10d are close to the other stator coils 10, by forming the faces 10c and 10d by applying pressure. Thus, spaces between the teeth portions 9b can be effectively used while insulation between the stator coils 10 is ensured.

Moreover, since the end face 10bc of the opposite-to-load side coil end 10b is not subjected to pressure forming, the possibility of impairing the round copper wire 12 crossing at the opposite-to-load side coil end 10b can be eliminated.

Figure 5:
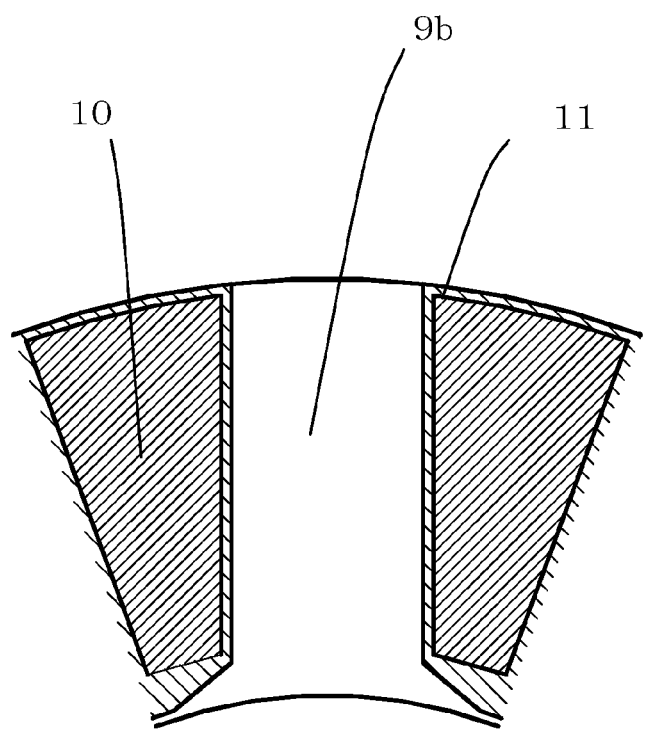
FIGS. 5A and 5B are enlarged views of the neighborhood of a stator coil.
Figure 5:
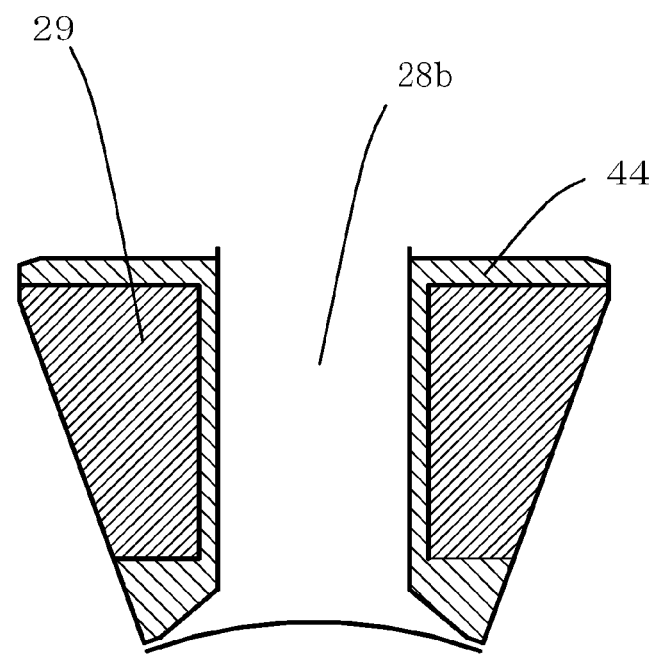

FIGS. 5A and 5B are enlarged views of the neighborhood of a stator coil. FIG. 5A is a front elevational view of the neighborhood of the stator coil 10 according to the first embodiment. FIG. 5B is a front elevational view of the neighborhood of a stator coil in a permanent magnet motor having a known structure shown in FIG. 2 in Japanese Unexamined Patent Application Publication No. 10-98844.

A stator coil 29 having a known structure is formed of a round copper wire that includes an insulating coating and is wound around a bobbin 44, as shown in FIG. 5B. The bobbin 44, around which the stator coil 29 is wound, is fixed to a teeth portion 28b of a stator core. The teeth portion 28b, to which the bobbin 44 is fixed, is disposed at a yoke portion (not shown) of the stator core. In this state, molding is performed using resin to integrate the yoke portion, the teeth portion 28b, the bobbin 44, and the stator coil 29. In this process, a known stator is manufactured.

The bobbin 44 is required to have sufficient strength to endure pressure applied in winding of the stator coil 29. Thus, the shape of the bobbin 44 has a thickness equal to or more than that necessary in view of insulation performance. Moreover, since the stator coil 29 is wound into a shape corresponding to the shape of the bobbin 44, the stator coil 29 is substantially trapezoidal in cross section, as shown in FIG. 5B.

On the other hand, the stator coil 10 according to the first embodiment is formed of a round copper wire that includes an insulating coating, as shown in FIG. 5A. The stator coil 10 is formed by molding the outer shape by pressing the wound round copper wire using a die. The stator coils 10 the outer shape of which is formed are fixed to the teeth portions 9b insulated with, for example, an insulating paper or powder coating. After this operation, in a state in which the teeth portions 9b are disposed along the internal circumference of the yoke portion 9a, molding is performed using the resin 11 to integrate the yoke portion 9a, the teeth portions 9b, and the stator coils 10. In this process, the stator 2 is formed.

Since the outer shape of the stator coil 10 is formed by applying pressure in a three-dimensional manner, except the end face 10bc of the opposite-to-load side coil end 10b, spaces where the stator core 9 does not exist can be fully used as spaces for the stator coil 10. Thus, the area of the cross section of the stator coil 10 is about 140% of that of the known structure.

Figure 6:
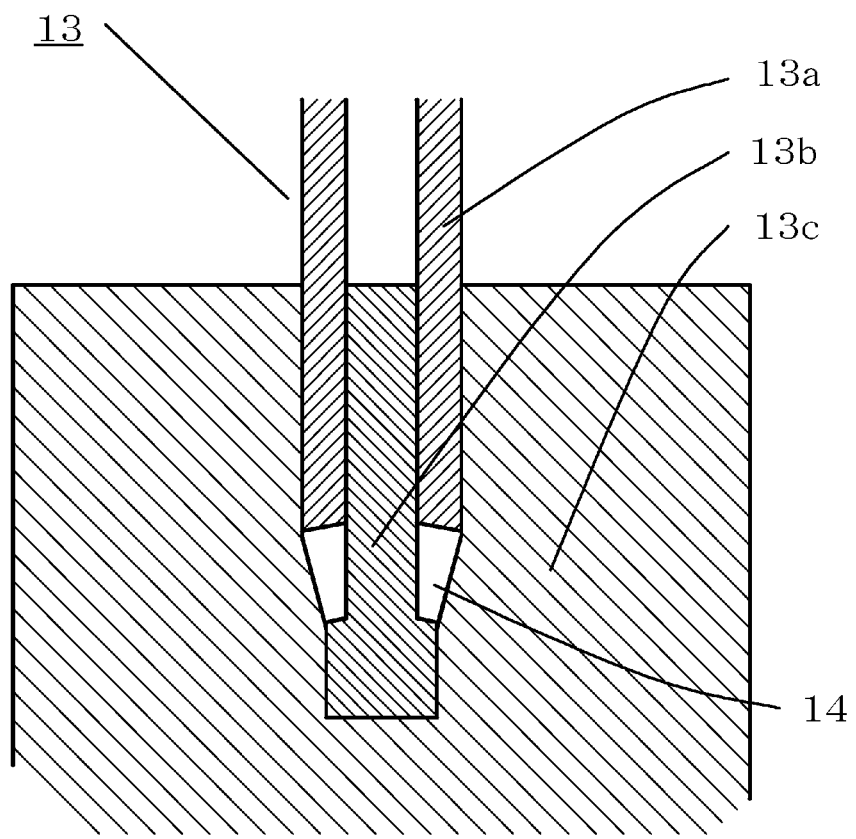
FIG. 6 is a cross sectional view of a main section of a pressure forming jig in the first embodiment of the present invention.

FIG. 6 is a cross sectional view of a main section of a pressure forming jig 13 that forms the stator coil 10 by applying pressure in the first embodiment of the present invention.

The pressure forming jig 13 includes an upper punch 13a, the lower punch 13b, and a die 13c, as shown in FIG. 6. A coil fixing space 14 is formed among the upper punch 13a, the lower punch 13b, and the die 13c. The stator coil 10 formed of a round copper wire that is wound and includes an insulating coating is fixed in the coil fixing space 14.

Figure 7A:
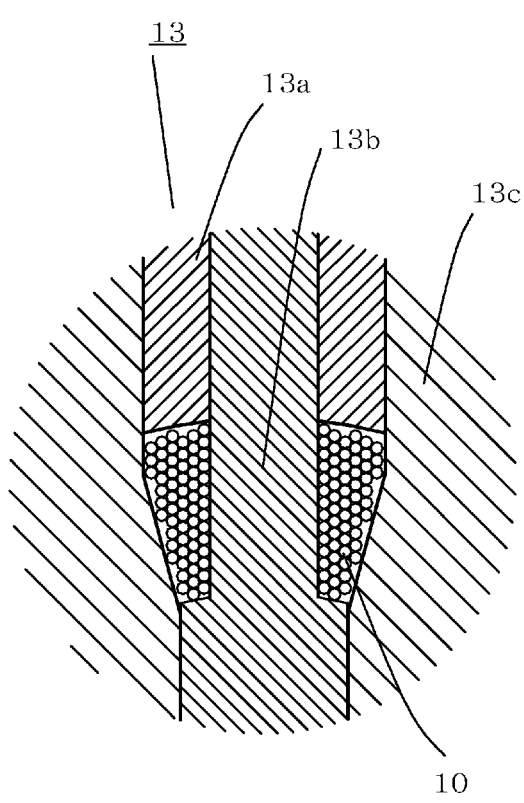
FIGS. 7A and 7B show pressure forming of a stator coil.
Figure 7B:
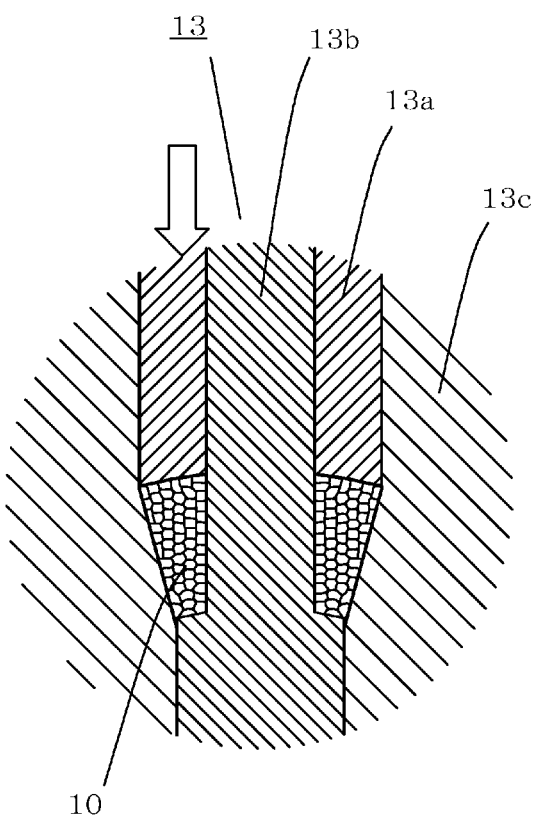

FIGS. 7A and 7B show pressure forming of the stator coil 10 using the pressure forming jig 13. FIG. 7A shows a state in which pressure has not been applied using the upper punch 13a. FIG. 7B shows a state in which pressure has been applied using the upper punch 13a.

The outer shape of the stator coil 10 fixed in the coil fixing space 14 is formed by applying pressure by moving the upper punch 13a downward from a position shown in FIG. 7A to a position shown in FIG. 7B. An outline arrow shown in FIG. 7B indicates the movement direction of the upper punch 13a.

Figure 8:
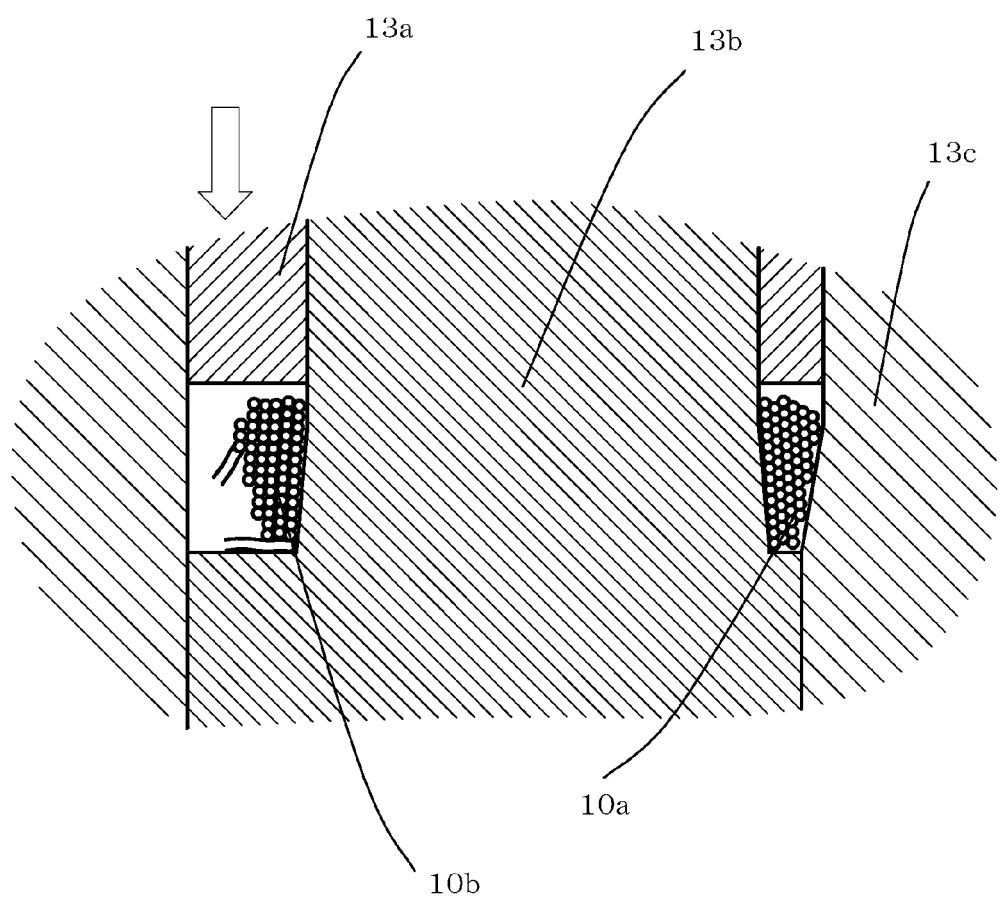
FIG. 8 is a cross sectional view of a pressure forming jig and a stator coil, as viewed from a direction perpendicular to the rotation axis direction.

FIG. 8 is a cross sectional view of the pressure forming jig 13 and the stator coil 10 shown in FIGS. 7A and 7B, as viewed from a direction perpendicular to the rotation axis direction. An outline arrow shown in FIG. 8 indicates the movement direction of the upper punch 13a.

Three dies, the upper punch 13a, the lower punch 13b, and the die 13c, have shapes such that the end face 10bc of the opposite-to-load side coil end 10b is not pressed, as shown in FIG. 8. Thus, the outer shape of the stator coil 10, except the end face 10bc of the opposite-to-load side coil end 10b, can be instantaneously formed by applying pressure, using the pressure forming jig 13, in a three-dimensional manner.

In this case, the shape of the stator coil 10 may be fixed by bonding a wound round copper wire by impregnating the round copper wire with varnish or by bonding a wound round copper wire by heat fusion bonding the insulating coating of the round copper wire. The fixation of the shape of the stator coil 10 facilitates handling of the stator coil 10 in the downstream steps. Moreover, the shape of the stator coil 10 may be fixed before pressure forming or after pressure forming.

Figure 9:
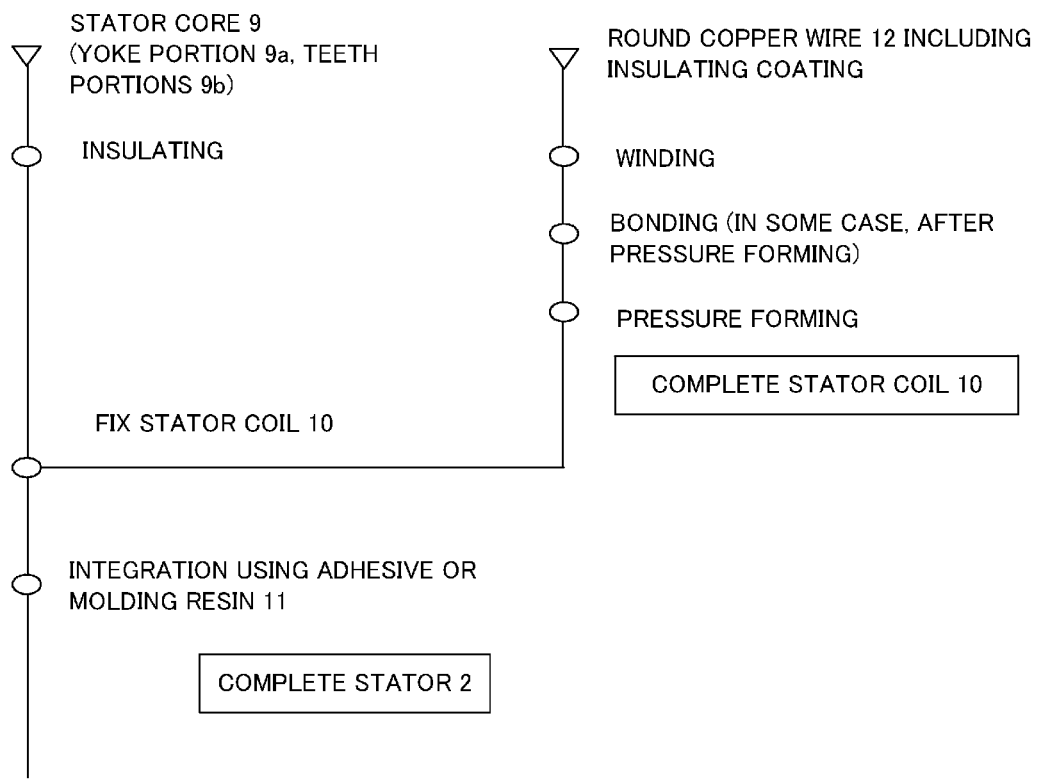
FIG. 9 is a flowchart showing the procedure for manufacturing a stator.

FIG. 9 is a flowchart showing the procedure for manufacturing the stator 2 described above. FIG. 9 shows a process from manufacturing the stator core 9 to completing the stator 2.

In FIG. 9, after the round copper wire 12 including an insulating coating is wound, the wound round copper wire 12 is bonded. Subsequently, the stator coil 10 is completed by forming the outer shape of the bonded round copper wire 12 by applying pressure. In this case, the wound round copper wire 12 may be bonded after pressure forming. Subsequently, the completed stator coils 10 are fixed to the teeth portions 9b of the stator core 9 insulated with, for example, an insulating paper or powder coating. Subsequently, in a state in which the teeth portions 9b are disposed along the internal circumference of the yoke portion 9a, molding is performed using the resin 11 to integrate the yoke portion 9a, the teeth portions 9b, and the stator coils 10. In this process, the stator 2 is completed. Alternatively, the yoke portion 9a, the teeth portions 9b, and the stator coils 10 may be integrated using an adhesive.

FIGS. 10A to 10C are views in which the heat releasing capability of a permanent magnet motor having a known structure shown in FIG. 1 in Japanese Unexamined Patent Application Publication No. 2002-369449 is compared with the heat releasing capability of a permanent magnet motor having the structure of the first embodiment. In FIGS. 10A to 10C, heat transfer is calculated in a state in which an 800-W-rated motor is attached to a wide heat sink in a room where ambient temperature is 60° C.

FIG. 10A shows temperature at the entrance and temperature at the exit of each part on a heat release path in the known structure. In FIG. 10A, it is assumed that heat at 82.5 W is generated from the interior of a stator coil, and the heat release path is a path on which the heat is released to the exterior of the motor via a frame and a load side bracket. In this case, for example, the entrance of a bobbin is the outer peripheral surface of the bobbin in contact with the stator coil, and the exit of the bobbin is the inner peripheral surface of the bobbin in contact with a stator core.

As a result of calculation, in the known structure, the internal temperature of the stator coil reaches 105° C. In this state, the heat of the stator coil was transferred to the outer peripheral surface (entrance) of the bobbin, with a small drop in temperature, to be transferred to the stator core, with a drop of about 20° C. in temperature in the bobbin. The heat transferred to the stator core is released to the exterior of the motor via the frame and the load side bracket.

FIG. 10B shows temperature at the entrance and temperature at the exit of each part on a heat release path in the structure of the first embodiment. In FIG. 10B, as in the case with FIG. 10A, it is assumed that heat at 82.5 W is generated from the interior of a stator coil. However, unlike FIG. 10A, the heat release path is a path on which the heat is released to the exterior of the motor via a load side bracket, bypassing a frame.

As a result of calculation, in the structure of the first embodiment shown in FIG. 10B, heat generated in the stator coil 10 is transferred directly to the load side bracket 3 via the molded resin 11 to be released to the exterior of the motor. Thus, it was found, even when heat at 82.5 W was generated in the stator coil 10, as in the case with FIG. 10A, the internal temperature of the stator coil 10 remained at 75° C.

FIG. 10C shows temperature at the entrance and temperature at the exit of each part on a heat release path in a case where heat in the stator coil 10 was increased until the internal temperature of the stator coil 10 in the structure of the first embodiment reached 105° C., as in the case with the known structure. This state is considered as the rated output of the structure of the first embodiment.

As a result of calculation, a 251 W of heat was generated in the stator coil 10. That is, while heat of up to 82.5 W is allowed in the known structure, heat of up to 251 W is allowed in the structure of the first embodiment. As a result, it is concluded that, assuming the same outer size as the known structure, the rated output can be about twice as much as that in the known structure.

Second Embodiment

Figure 11:
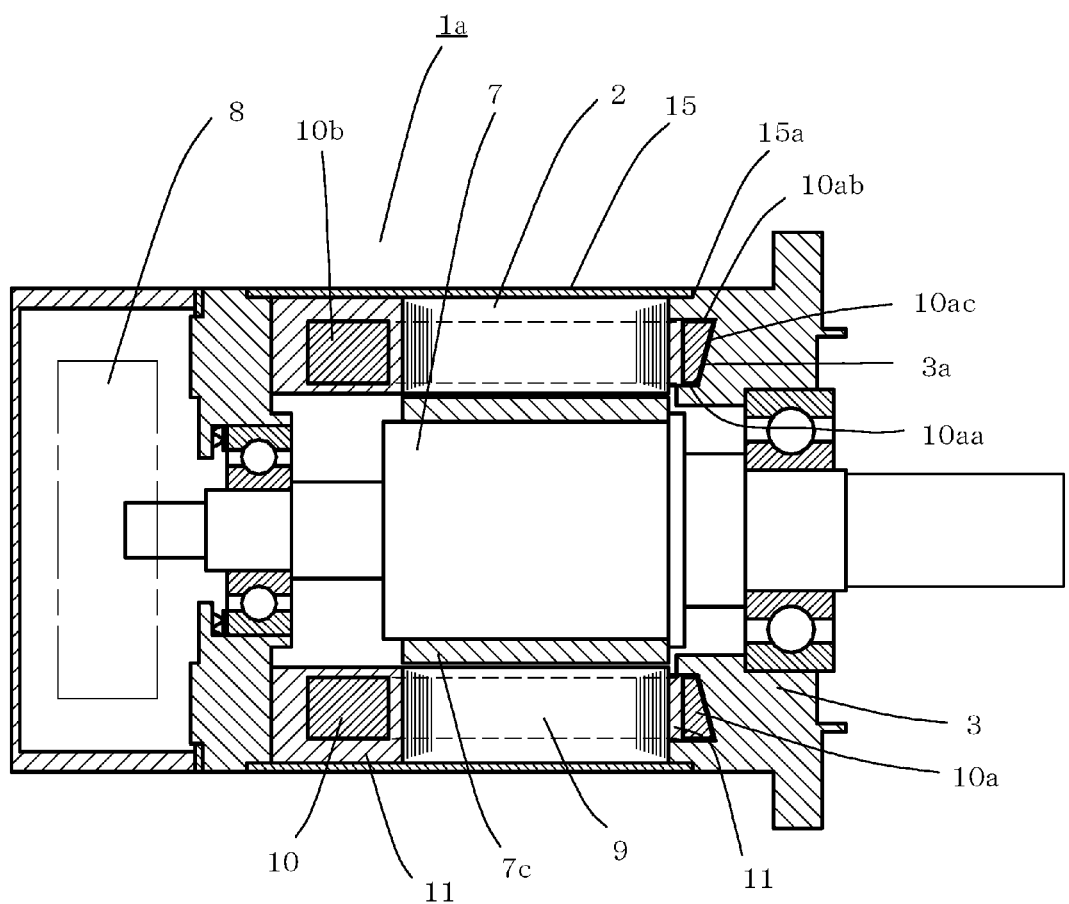
FIG. 11 is a side elevational view of a rotary electric motor according to a second embodiment of the present invention.

FIG. 11 is a side elevational view of a rotary electric motor according to a second embodiment of the present invention. While no frame is provided in the rotary electric motor according to the first embodiment, as shown in FIG. 1, a frame 15 may be provided, as in a rotary electric motor 1a according to the second embodiment shown in FIG. 11.

The frame 15 is cylindrical and holds the stator 2, with the stator 2 being fitted to the inner peripheral surface of the frame 15. A load side end 15a of the frame 15 is in close contact with the load side bracket 3.

According to the second embodiment, since the frame 15 fitted to the outer peripheral surface of the stator 2 is provided, the size increases accordingly. However, heat generated in the stator coil 10 can be released to the exterior of the rotary electric motor 1a from not only the load side bracket 3 but also the frame 15. Thus, heat generated in the stator coil 10 can be more efficiently released to the exterior, thereby improving the rated output of the rotary electric motor 1a.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A rotary electric motor comprising:
   a rotor having an outer peripheral side;
   a stator provided to surround the outer peripheral side of the rotor with a gap between the stator and the rotor, the stator including a stator coil and a stator core having teeth portions around which the stator coil is wound, a load side coil end of the stator coil protruding from a load side end face of the stator core, the stator coil comprising a copper wire that has an outer peripheral surface and a cross section perpendicular to a longitudinal direction of the copper wire; and a load side bracket having a recess and provided on the load side coil end of the stator coil, the cross section of the copper wire being deformed so that the outer peripheral surface closely contacts an inner surface of the recess at least two of an inner peripheral surface, an outer peripheral surface, and an end face of the load side coil end via an insulator.

2. The rotary electric motor according to claim 1, further comprising:

a cylindrical frame having an inner peripheral surface on which the stator is provided, a load side end of the frame contacting the load side bracket.

3. The rotary electric motor according to claim 1, wherein the outer peripheral surface of the copper wire contacts the inner surface of the recess at the inner peripheral surface, the outer peripheral surface, and the end face of the load side coil end.

4. The rotary electric motor according to claim 1, wherein the stator coil is formed of a round copper wire that includes an insulating coating.

5. The rotary electric motor according to claim 1, wherein the stator coil comprises air-core coil that includes outer surfaces formed by applying pressure three-dimensionally.

6. The rotary electric motor according to claim 1,
wherein the copper wire of the stator coil is wound in a fairly neat manner,
wherein the copper wire crosses each other at an end face of an opposite-to-load side coil end of the stator coil, and
wherein outer surfaces of the stator coil other than the end face of the opposite-to-load side coil end are subjected to three-dimensional pressure to deform the cross section of the copper wire.

7. The rotary electric motor according to claim 1, wherein the insulator comprises molding resin that integrates the stator coil and the stator core.

8. The rotary electric motor according to claim 1,
wherein the stator coil is formed of a copper wire, and
wherein the insulator comprises a insulating coating which covers an outer surface of the copper wire.

9. A rotary electric motor comprising:

a rotor having an outer peripheral side;

a stator including a stator coil and provided to surround the outer peripheral side of the rotor with a gap between the stator and the rotor, the stator coil comprising a copper wire that has an outer peripheral surface and a cross section perpendicular to a longitudinal direction of the copper wire; and a load side bracket having a recess and provided on a load side coil end of the stator coil, the cross section of the copper wire being deformed so that the outer peripheral surface closely contacts an inner surface of the recess at least two faces of an inner peripheral surface, an outer peripheral surface, and an end face of the load side coil end of the stator coil via an insulator.

* * * * *